(12) United States Patent
Thanneeru

(10) Patent No.: US 10,924,913 B2
(45) Date of Patent: Feb. 16, 2021

(54) FAULT HANDLING FOR LOCATION SERVICES REQUESTS

(71) Applicant: T-Mobile USA, Inc., Bellevue, WA (US)

(72) Inventor: Suresh Thanneeru, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 75 days.

(21) Appl. No.: 15/956,622

(22) Filed: Apr. 18, 2018

(65) Prior Publication Data

US 2019/0327602 A1    Oct. 24, 2019

(51) Int. Cl.
| | |
|---|---|
| H04W 8/02 | (2009.01) |
| H04W 4/02 | (2018.01) |
| H04W 88/16 | (2009.01) |
| H04W 64/00 | (2009.01) |
| H04W 24/04 | (2009.01) |

(52) U.S. Cl.
CPC ............... H04W 8/02 (2013.01); H04W 4/02 (2013.01); H04W 24/04 (2013.01); H04W 64/003 (2013.01); H04W 88/16 (2013.01)

(58) Field of Classification Search
None
See application file for complete search history.

(56) References Cited

U.S. PATENT DOCUMENTS

| | | | | |
|---|---|---|---|---|
| 7,116,984 B1 * | 10/2006 | Muhonen | .............. | H04W 64/00 455/456.1 |
| 7,305,365 B1 * | 12/2007 | Bhela | .................... | G06Q 10/00 455/456.1 |
| 8,412,202 B2 * | 4/2013 | Barankanira | ....... | H04L 12/5692 370/331 |
| 9,055,547 B1 * | 6/2015 | Janakiraman | ......... | G01S 5/0263 |
| 2006/0174329 A1 * | 8/2006 | Dublish | .................. | H04W 8/16 726/4 |
| 2008/0293431 A1 * | 11/2008 | Buerger | .................. | H04L 67/18 455/456.1 |

(Continued)

OTHER PUBLICATIONS

ETSI.org "Digital Cellular Telecommunications System," retrieved on Feb. 15, 2018 at http://www.etsi.org/deliver/etsi_ts/129100_129199/129171/09.02.00_60/ts_129171v090200p.pdf; European Telecommunications Standards Institute (ETSI), ETSI TS 129 171, V9.2.0 (Oct. 2010), pp. 1-53.

*Primary Examiner* — Noel R Beharry
*Assistant Examiner* — Rodrick Mak
(74) *Attorney, Agent, or Firm* — Lee & Hayes, P.C.

(57) ABSTRACT

A cellular network may provide location services so that clients such as public service access points (PSAPs) can obtain locations of mobile devices. A location request is received first by a Gateway Mobile Location Center (GMLC), which responds by querying a Mobility Management Entity (MME). The MME is configured to query a Serving Mobile Location Center (SMLC) for the location. In some cases, the SMLC fail to respond or may respond with an error indication. In response to certain types of errors, the MME is configured to attempt to obtain the requested location from an alternate SMLC, rather than reporting an error back to the GMLC. Status information is maintained by the MME to keep track of any SMLCs that have returned errors, and these SMLCs are avoided when processing further requests.

20 Claims, 4 Drawing Sheets

(56) References Cited

U.S. PATENT DOCUMENTS

| | | | |
|---|---|---|---|
| 2012/0225647 A1* | 9/2012 | Nishida | H04W 36/32 |
| | | | 455/423 |
| 2013/0150085 A1* | 6/2013 | Jin | G01S 19/48 |
| | | | 455/456.2 |
| 2014/0357198 A1* | 12/2014 | Ye | H04W 4/024 |
| | | | 455/73 |
| 2015/0201305 A1* | 7/2015 | Edge | H04W 4/021 |
| | | | 455/456.3 |
| 2016/0112861 A1* | 4/2016 | Qu | H04W 76/10 |
| | | | 455/432.1 |
| 2017/0127324 A1* | 5/2017 | Liang | H04W 48/00 |
| 2018/0192234 A1* | 7/2018 | Mohamed | H04L 69/40 |

\* cited by examiner

FAULT HANDLING FOR LOCATION SERVICES REQUESTS

BACKGROUND

The ability to access emergency response services by dialing a reserved emergency telephone number, such as 911 in the United States, is a vital component of public safety and emergency preparedness. In the United States, the Federal Communications Commission (FCC) has established a set of rules and regulations that require mobile communication providers to deliver enhanced emergency services to their subscribers. In particular, mobile communication providers are, in many circumstances, required to provide a current location of a 911 caller to emergency services.

There are also other situations where it is useful to know the location of a device. For example, various location-based services may utilize location information to provide services relating to marketing, navigation, social media check-ins, billing, geotagging, etc.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

The described implementations provide devices, systems, and methods used within a cellular communications network to allow location-based services to obtain locations of communication devices within the network.

In accordance with techniques that are described in more detail below, a client entity may at times need to obtain the location of a mobile device or other cellular communication device. A Public Safety Access Point (PSAP) is an example of a client entity that uses location services of a cellular communications network when responding to emergencies, such as when responding to 911 calls.

To obtain the location of a particular user equipment (UE), a Location Services (LCS) client sends a request to a server that is referred to as a Gateway Mobile Location Center (GMLC). The GMLC is responsible for communicating with LCS clients, but is dependent on location servers, referred to as Serving Location Centers (SMLCs) to obtain UE locations.

Upon receiving a location request, the GMLC sends a corresponding request to a Mobile Management Entity (MME) of the communication network. The MME then sends a corresponding request to an SMLC.

In some cases, the SMLC may fail to return the requested location. In some cases, for example, the SMLC may respond to the request from the MME, but may indicate that an error or failure occurred. In other cases, it may happen that no response is received from the SMLC in response to the request from the MME.

In the case of a failure such as this, instead of reporting an error to the GMLC, the MME may be configured to submit a second location request to another SMLC. In some cases, the other SMLC may be successful in providing the location of the specified mobile device, and the MME can return the location to the requesting GMLC, from where it is returned to the LCS client.

In some embodiments, the MME may maintain status information for one or more potentially available SMLCs, 0

The described techniques prevent the situation in which location requests to a GMLC may repeatedly fail because an MME continues to query the same, failing SMLC. Instead, the MME may try one or more additional SMLCs in an attempt to obtain the requested location, and in the future may avoid requests to the failing SMLC.

Figure 1:
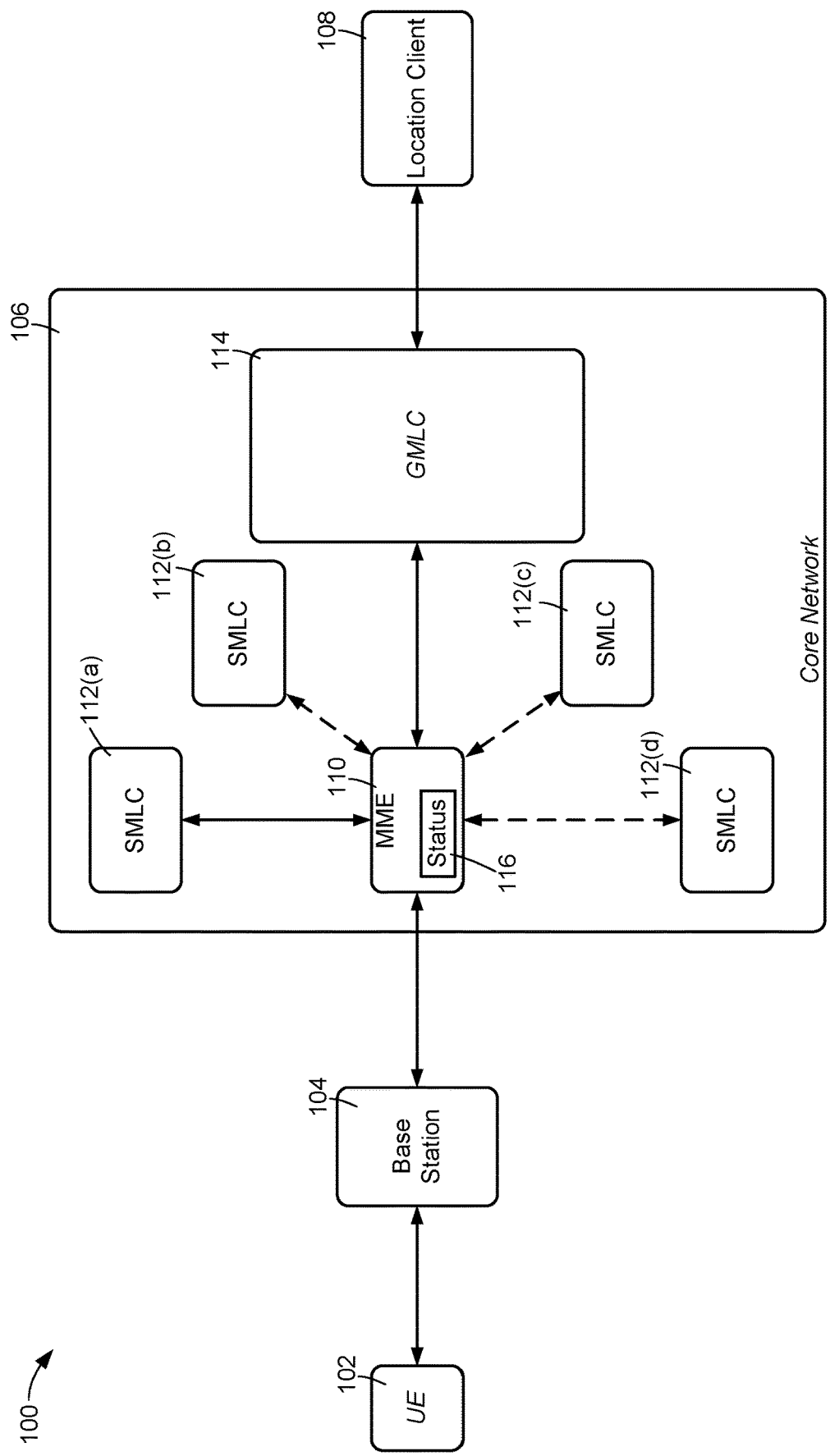
FIG. 1 is a block diagram illustrating relevant components of an environment in which the described techniques may be implemented.

FIG. 1 illustrates an example environment 100 within which the described techniques may be implemented. In FIG. 1, a mobile, cellular communication device 102, also referred to as user equipment or UE 102, communicates through a base station 104 with a core network 106 of a cellular communications system. The core network 106 is configured to provide location information to multiple location clients 108, of which a single location client 108 is shown in FIG. 1.

The UE 102 may comprise any type of device capable of wireless communications with the base station 104 or other components of the cellular communication system, such as a cell phone, a smartphone, a computer, a tablet computer, an automotive control/monitoring system, etc.

The core network 106 may, as an example, comprise a GSM network, such as an Evolved Packet Core (EPC) network as used in Long-Term Evolution (LTE) networks. Relevant components of the core network 106 include one or more Mobility Management Entities (MMEs) 110, multiple Serving Mobile Location Centers (SMLCs) 112, and a Gateway Mobile Location Center (GMLC) 114.

The MMEs 110 of the core network 106 are signaling nodes that are responsible for registering UEs, selecting appropriate gateways, routing communications between components, etc. Most relevant to this discussion, an MME 110 receives and responds to location requests regarding individual UEs.

An SMLC 112 is a node within the core network 106 that determines the geographic position of a specified mobile device, based on signal characteristics and/or other available information. In an EPC network, the SMLC 112 may be referred to as an Evolved SMLC, or e-SMLC. The SMLC 112 may use various techniques for determining device position, and in some cases may communicate with the UE 102 for assistance in determining the location of the UE 102. Locations provided by SMLCs may be estimated locations, and may have varying degrees of specificity and/or accuracy.

The core network 106 may have multiple SMLCs, of which four SMLCs 112 are shown in FIG. 1, designated by reference numerals 112(a), 112(b), 112(c), and 112(d). The core network 106 provides networked communications between the various components, including between the MME 110 and the multiple SMLCs 112.

The GMLC 114 is an interface to multiple external location clients. The GMLC 114 can be queried by the location client 108 to obtain the current location of a specified UE. In operation, the GMLC 114 contacts the SMLC 112, through an MME 110, to obtain the location of the UE 102. In some environments, the GMLC 114 may be referred to as an LCS server.

The location client 108 may comprise any of various devices, components, and/or entities. For example, location clients may include Public Safety Access Points (PSAPs) or other entities that receive, process, and/or respond to emergency calls such as 911 calls. Other location clients may include web services, device applications, and so forth. Some types of location clients may be referred to as Location Services (LCS) or Location-Based Services (LBS). The UE 102 itself, or applications running on the UE 102, may at times query the location service 114 in order to determine its own location, and may therefore act as a location client.

The environment 100 may include additional components, systems, and/or functions that are involved in communications relating to receiving and responding to location requests.

The arrows of FIG. 1 represent typical communication paths between the illustrated components. Dashed arrows represent available alternate communication paths. Generally, the location client 108 queries the GMLC 114 for location information. The GMLC 114 responds by querying the MME 110, which in turn queries the SMLC 112(*a*).

In practice, the MME 110 may query any of multiple available SMLCs 112 to obtain the current location of the UE 102. In accordance with techniques described herein, the MME 110 may query multiple SMLC until one of the SMLCs is able to provide the requested location.

In certain embodiments, the MME 110 may maintain status information 116 that indicates which of the SMLCs have failed to provide a requested location in response to a corresponding request. These SMLCs are referred to herein as disqualified SMLCs. Before sending a location request to an SMLC, the MME 110 may examine the status information 116 to identify an SMLC that is not currently disqualified, and then send the request to that SMLC.

Figure 2:
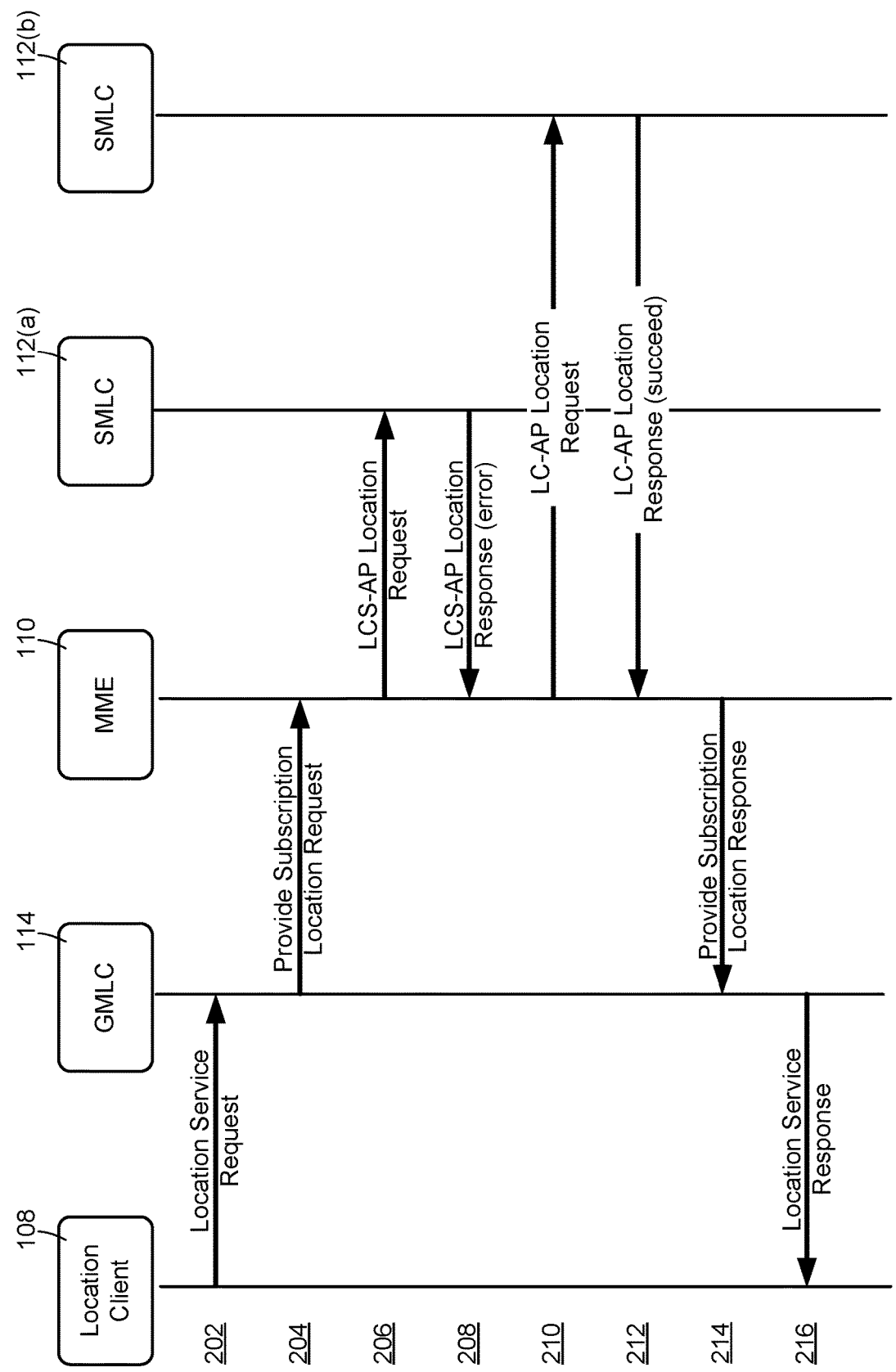
FIG. 2 is a diagram of an example call flow, illustrating a sequence of communications that occur when providing location services.

FIG. 2 illustrates a high-level call flow that may be implemented by the components of FIG. 1 for responding to location requests. In FIG. 2, communicating components or entities are listed along the top, with respectively corresponding vertical lines extending downward. Communications are indicated by arrows that extend horizontally from and to the vertical lines corresponding to the entities from which the communications originate and terminate, respectively. Communications occur in order from top to bottom. An individual communication or set of communications is indicated by a corresponding reference numeral along the left side of the figure, horizontally aligned with the arrow or arrows representing the communication.

Note that FIG. 2 illustrates the most relevant communications and may omit other communications that occur in practice but are less relevant to the topics at hand. Such other communications may include communications that both precede and follow the illustrated communications, communications that occur in time between the illustrated communications, and communications that occur between components or entities that are not specifically shown.

The call flow of FIG. 2 will be described in context of the environment shown in FIG. 1, although the call flow may also be implemented different types of networks.

At 202, the location client 108 sends a Location Service Request to the GMLC 114. The Location Service Request specifies a target UE identity, among other information. The Location Service Request, as well as other communications between the location client 108 and the GMLC 114, are specified by 3GPP Technical Specification TS 23.271.

At 204, the GMLC 114 responds by sending a Provide Subscriber Location Request to the MME 110. The Provide Subscriber Location Request again specifies a target UE identity, corresponding to the target UE specified by the Location Service Request from the location client 108. The Provide Subscriber Location Request, as well as other communications between the GMLC 114 and the MME 110, are specified by 3GPP Technical Specification TS 29.172.

At 206, the MME 110 sends an LCS-AP Location Request to one of the SMLCs 112(*a*), which will be referred to as the first SMLC 112(*a*). The LCS-AP Location Request and other communications between the MME 110 and the SMLC 112(*a*) are specified by 3GPP Technical Specification TS 29.171. The LCS-AP Location Request specifies the target UE 102, among other information.

For purposes of discussion, it will be assumed that the first SMLC 112(*a*) is unable to obtain the requested location and instead returns error information in an LCS-AP Location Response. The error information may include one or more cause codes indicating the types of errors encountered by the first SMLC 112(*a*) when attempting to obtain and provide the requested location.

At 210, the MME sends a second LCS-AP Location Request to another SMLC 112, which is assumed in this example to be the second SMLC 112(*b*).

At 212, the second SMLC 112(*b*) returns an LCS-AP Location Response, indicating the location of the specified UE 102. This assumes that the second SMLC 212(*b*) is successful in obtaining an estimation of the location of the specified UE 102.

At 214, the MME 110 returns a Provide Subscription Location Response to the GMLC 114, indicating the location specified by the second SMLC 112(*b*).

At 216, the GMLC 114 returns a Location Service Response to the location client 108, indicating the location as provided by the GMLC 114.

Figure 3:
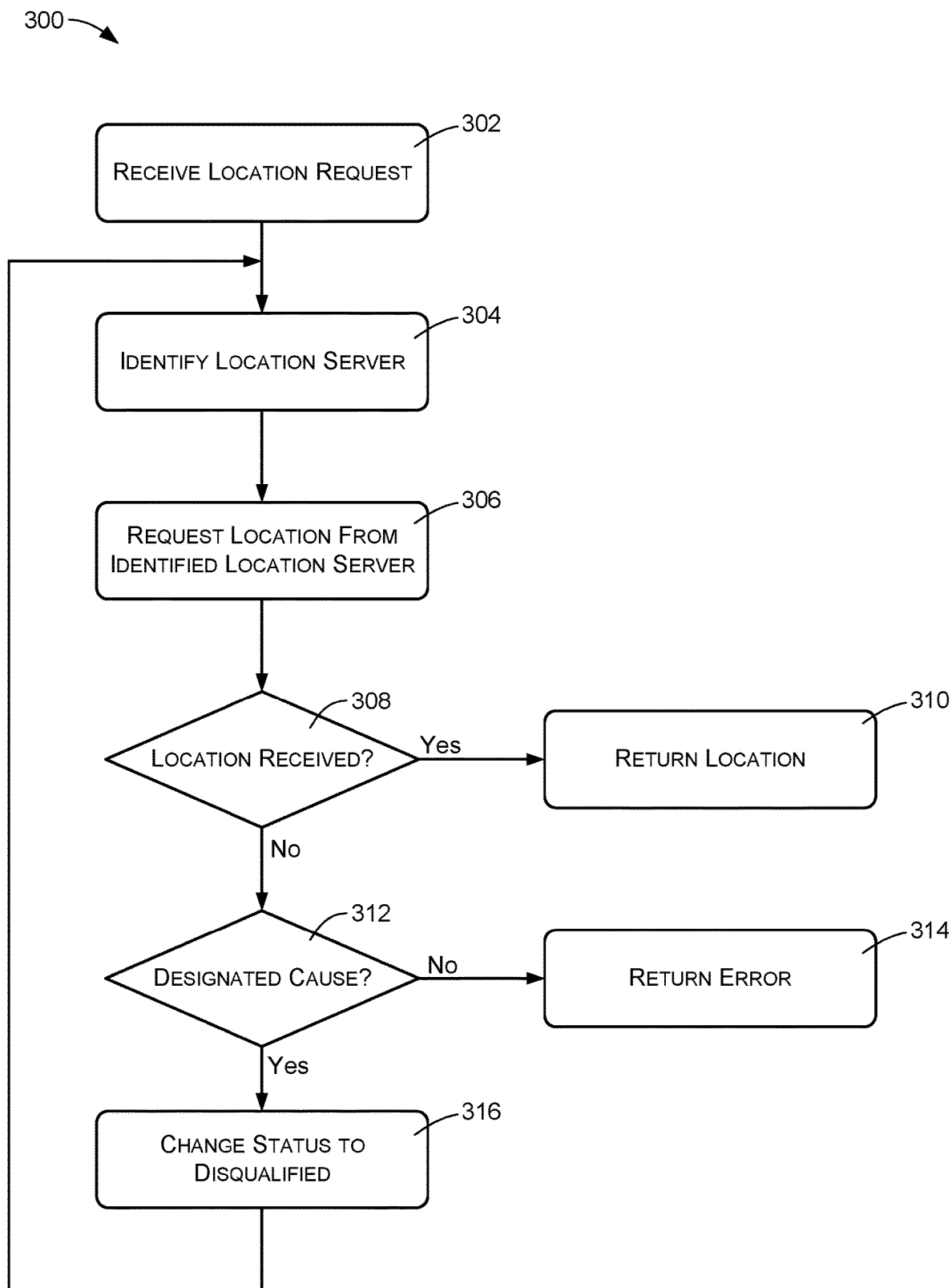
FIG. 3 is a flow diagram illustrating an example method of handling location requests.

FIG. 3 shows an example method 300 that may be performed by a mobile management component, such as the MME 110 of FIG. 1, for handling location requests.

An action 302 comprises receiving a request for a location of a UE such as a cellular communication device. In the described embodiments, the action 302 may comprise receiving, from the GMLC 114, a Provide Subscription Location Request, requesting the location of the UE 102.

An action 304 comprises identifying a location server that is not currently disqualified as a provider of location services. In the described embodiments, the location server is identified from the SMLCs 112, based at least in part on the status information 116 that is maintained by the MME 110. As will be described below, the status information 116 for a particular SMLC indicates that an individual SMLC is disqualified in certain situations where there has been a failure to receive a requested location from the SMLC.

An action 306 comprises requesting the location of the UE from the identified location server. In the described embodiments, the action 306 may comprise sending a Location Request to the first SMLC 112(*a*), requesting the location of the UE 102.

An action 308 comprises determining whether the location of the UE has been received from the location server, or if instead the MME has failed to receive the location from the location server. In some cases, the action 308 may comprise receiving a Location Response from the SMLC 112 and determining whether the Location Response indicates a location or if instead the Location Response specifies an error or other failure. In some cases, it may be that no response is received from the location server, which is also considered to be a failure.

In response to determining that a location has been received from the location server, an action 310 is performed of returning the location of the UE 102 to the requesting GMLC 114 as a response to the request received in the action 302. In the described embodiments, the action 310 comprises sending a Provide Subscription Location Response to the GMLC 114, where the Provide Subscription Location Response specifies the location of the UE as specified by the location server.

In response to determining in the action 308 that there is has been a failure to receive the location of the UE from the location server, an action 312 is performed of determining whether the failure is due to one or more pre-designated causes. The action 312 may be performed in the described embodiments by referencing one or more cause codes that are specified by the Location Response, in situations where the Location Response fails to return the requested location.

Cause codes specified by Location Responses from an SMLC are categorized generally as relating to (a) Radio Network Layer, (b) Transport Layer, (c) Protocol, and (d) Miscellaneous. Of these, the MME 110 is configured to treat Miscellaneous errors as being specific to the SMLC 112 from which the cause code is received, and the pre-designated causes correspond to these cause codes. Specifically, in some embodiments, the pre-designated cause codes may comprise, as specified by 3GPP Technical Specification TS 29.171.7.4.16:

Processing Overload;
Hardware Failure; and
Operations and Maintenance Intervention.

These codes correspond to causes that are likely unique to the SMLC or that are not likely to be encountered with other SMLCs. In implementation, the MIME may be dynamically configurable, so that different or additional cause codes can be pre-designated in different situations.

If the failure is not due to any of the pre-designated causes, an action 314 is performed of returning an error indication, including an indication or description of the failure, as a response to the request that was received in 202. In the described embodiments, the action 314 may comprise sending a Provide Subscription Location Response to the requesting GMLC 114, indicating that there was an error in obtaining the requested location and in some cases also indicating information about the error.

In response to determining that the failure is due to the one or more pre-designated causes, an action 316 is performed. The action 316 comprises changing the status information 116 to indicate that the location server to which the request was sent in the action 306 is currently disqualified as a provider of location services.

The actions are iterated, with each subsequent iteration starting at the action 304 of identifying a location server. During a first iteration, a location request is sent to a first location server. If there is a failure to obtain the location and the cause of the failure is one of the pre-designated causes, a second iteration is performed. During the second iteration, a second location request is sent to a second, alternate location server. This is repeated until either a location is received or until a cause code is received that doesn't correspond to one of the pre-designated causes. In practice, there may be a limit to how many iterations are performed before returning an error message to the requesting GMLC 114.

Figure 4:
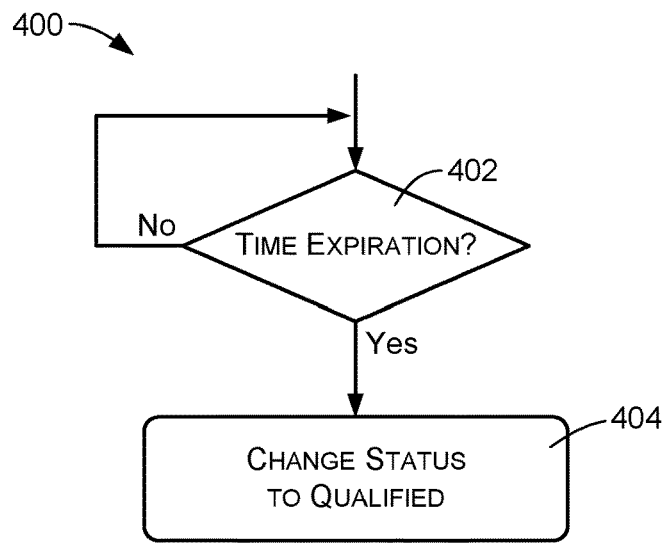
FIG. 4 is a flow diagram illustrating an example method of managing status information relating to location servers.

FIG. 4 illustrates an example method 400 that may be performed by the mobile management component to manage the status information 116 regarding disqualified location servers. The example method 400 is performed repeatedly for each location server that has been designated as being disqualified.

An action 402 comprises determining whether a predetermined length of time has passed since the location server was designated as being disqualified. If the predetermined time period has not passed, the action 402 is repeated. If the predetermined time period has passed, an action 404 is performed of changing the status information to indicate that the location server is no longer disqualified. This allows the location server to be used again, but if it is still unable to obtain locations the method 300 will result in it being again disqualified.

Figure 5:
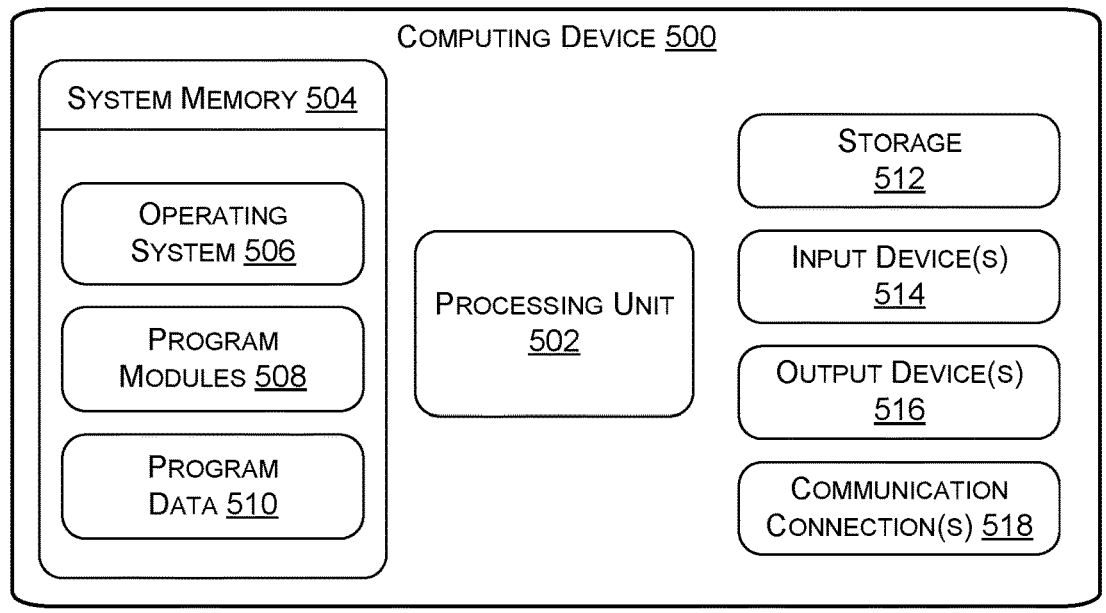
FIG. 5 is a block diagram of an example computing device that may be configured to implement various components shown in FIG. 1.

FIG. 5 shows high-level components of an illustrative computing device 500 such as may be used to implement various components of the core network 106, such as servers, routers, gateways, administrative components, etc. In particular, each of the base station 104, the location client 108, the MME 110, the SMLCs 112, and the GMLC 114 may include and/or may be implemented by an instance of the computing device 500.

In various embodiments, the computing device 500 may include at least one processing unit 502 and system memory 504. Depending on the exact configuration and type of computing device, the system memory 504 may be volatile (such as RAM), non-volatile (such as ROM, flash memory, etc.) or some combination of the two. The system memory 504 may include an operating system 506, one or more program modules 508, and may include program data 510. In the case of the MME 110, the program data 510 may include data corresponding to the status information 116.

The computing device 500 may also include additional data storage devices (removable and/or non-removable) such as, for example, magnetic disks, optical disks, or tape. Such additional storage is illustrated in FIG. 5 by storage 512.

Non-transitory computer storage media of the computing device 500 may include volatile and nonvolatile, removable and non-removable media implemented in any method or technology for storage of information, such as computer readable instructions, data structures, program modules, or other data. The system memory 504 and storage 512 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such non-transitory computer-readable storage media may be part of the computing device 500.

In various embodiment, any or all of the system memory 504 and storage 512 may store programming instructions which, when executed, implement some or all of the function functionality described above as being implemented by components the MME 110.

The computing device 500 may also have input device(s) 514 such as a keyboard, a mouse, a touch-sensitive display, voice input device, etc. Output device(s) 516 such as a display, speakers, a printer, etc. may also be included. The computing device 500 may also contain communication connections 518 that allow the device to communicate with other computing devices.

Although features and/or methodological acts are described above, it is to be understood that the appended claims are not necessarily limited to those features or acts. Rather, the features and acts described above are disclosed as example forms of implementing the claims.

What is claimed is:

1. A method performed by a Mobility Management Entity (MME) for a cellular communications network, the method comprising:
  receiving a Provide Subscription Location Request for a location of a cellular communication device;
  sending a first Location Request to a first Serving Mobile Location Center (SMLC) to request the location of the cellular communication device;
  in response to sending the first Location Request, receiving a first Location Response from the first SMLC, wherein the first Location Response indicates a failure to obtain the location of the cellular communication device;
  in response to the first Location Response indicating the failure and instead of reporting an error to a Gateway Mobile Location Center (GMLC), sending a second Location Request to a second SMLC, other than the first SMLC, to request the location of the cellular communication device;
  receiving a second Location Response from the second SMLC, wherein the second Location Response specifies the location of the cellular communication device; and
  sending a Provide Subscription Location Response, wherein the Provide Subscription Location Response specifies the location of the cellular communication device.

2. The method of claim 1, further comprising:
  receiving another Provide Subscription Location Request for another location of another cellular communication device;
  identifying an alternate SMLC other than the first SMLC; and
  sending a third Location Request to the alternate SMLC to request the other location of the other cellular communication device.

3. The method of claim 1, further comprising:
  maintaining status information indicating whether each of one or more SMLCs is currently disqualified as a provider of location services; and
  in further response to the first Location Response indicating the failure, changing the status information to indicate that the first SMLC is currently disqualified as a provider of location services.

4. The method of claim 3, further comprising:
  sending a third Location Request to request another location of another cellular communication device;
  receiving a third Location Response, wherein the third Location Response indicates a cause of another failure to obtain the other location of the other cellular communication device;
  determining whether the cause is due to one or more pre-designated causes; and
  in response to determining that the cause is due to the one or more pre-designated causes, identifying an alternate SMLC based at least in part on the status information indicating that the alternate location server is not currently disqualified as a provider of location services; and
  sending a fourth Location Request to the alternate SMLC to request the other location of the other cellular communication device.

5. The method of claim 1, further comprising:
  receiving another Provide Subscription Location Request for another location of another cellular communication device;
  sending a third Location Request to request the other location of the other cellular communication device;
  receiving a third Location Response, wherein the third Location Response indicates a cause of another failure to obtain the other location of the other cellular communication device;
  determining whether the cause is due to one or more pre-designated causes;
  in response to determining that the cause is due to one or more pre-designated causes, identifying an alternate SMLC; and
  sending a fourth Location Request to the alternate SMLC to request the other location of the other cellular communication device.

6. The method of claim 1, further comprising:
  receiving another Provide Subscription Location Request for another location of another cellular communication device;
  sending a third Location Request to request the other location of the other cellular communication device;
  receiving a third Location Response, wherein the third Location Response indicates a cause of another failure to obtain the other location of the other cellular communication device;
  determining whether the cause is due to one or more pre-designated causes; and
  in response to determining that the cause is not due to any of one or more pre-designated causes, sending another Provide Subscription Location Response, wherein the other Provide Subscription Location Response indicates the other failure.

7. A mobility management component for use in a cellular communications network, the mobility management component comprising:
  one or more processors;
  one or more non-transitory computer-readable media storing computer-executable instructions that, when executed on the one or more processors, cause the one or more processors to perform actions comprising:
    receiving a request for a location of a cellular communication device;
    requesting the location of the cellular communication device from a first location server;
    in response to requesting the location of the cellular communication device, determining that there has been a failure to receive the location of the cellular communication device from the first location server; and
    in response to determining that there has been a failure to receive the location of the cellular communication device from the first location server and instead of reporting an error to a gateway mobile location server:
    (a) identifying a second location server as an alternative to the first location server, and (b) requesting the location of the cellular communication device from the second location server.

8. The mobility management component of claim 7, wherein:

the mobility management component comprises a Mobile Management Entity (MME) of a Global System for Mobile (GSM) network;

the request is received from a Gateway Mobile Location Center Server (GMLC) of the GSM network, wherein the gateway mobile location server comprises the GMLC; and each of the first and second location servers comprises a Serving Mobile Location Center (SMLC) of the GSM network.

9. The mobility management component of claim 7, the actions further comprising:

receiving the location of the cellular communication device from the second location server; and returning the location of the cellular communication device as a response to the received request.

10. The mobility management component of claim 7, the actions further comprising:

receiving another request for another location of another cellular communication device;

identifying an alternate location server other than the first location server; and requesting the other location of the other cellular communication device from the alternate location server.

11. The mobility management component of claim 7, the actions further comprising:

maintaining status information indicating whether each of one or more location servers is currently disqualified as a provider of location services; and in further response to determining that there has been a failure to receive the location of the cellular communication device from the first location server, changing the status information to indicate that the first location server is currently disqualified as a provider of location services.

12. The mobility management component of claim 11, the actions further comprising:

prior to requesting the location of the cellular communication device from the first location server, identifying the first location server based at least in part on the status information indicating that the first location server is not currently disqualified as a provider of location services.

13. The mobility management component of claim 7, the actions further comprising:

receiving another request for a location of another cellular communication device;

requesting the location of the other cellular communication device from a third location server;

determining that there has been another failure to receive the location of the other cellular communication device from the third location server;

determining that the other failure is due to one or more pre-designated causes; and in response to determining that the other failure is due to the one or more pre-designated causes, requesting the location of the other cellular communication device from a fourth location server.

14. The mobility management component of claim 7, the actions further comprising:

receiving another request for another location of another cellular communication device;

requesting the other location of the other cellular communication device from a third location server;

determining that there has been another failure to receive the other location of the other cellular communication device from the third location server;

determining that other failure is due to one or more pre-designated causes;

in response to determining that the other failure is due to the one or more pre-designated causes, identifying an alternate location server other than the third location server based on status information indicating that the alternate location server is not currently disqualified from providing location services; and requesting the other location of the other cellular communication device from the alternate location server.

15. The mobility management component of claim 7, the actions further comprising:

receiving another request for a location of another cellular communication device;

requesting the location of the other cellular communication device from a third location server;

determining that there has been another failure to receive the location of the other cellular communication device from the third location server;

determining that the other failure is not due to any of one or more pre-designated causes; and in response to determining that the other failure is not due to any of the one or more pre-designated causes, returning an indication of the other failure.

16. A mobility management component for use in a cellular communications network, the mobility management component comprising:

one or more processors;

one or more non-transitory computer-readable media storing computer-executable instructions that, when executed on the one or more processors, cause the one or more processors to perform actions comprising:

receiving a request for a location of a cellular communication device;

based at least in part on status information that indicates whether each of one or more location servers is currently disqualified as a provider of location services, identifying a first location server that is not currently disqualified as a provider of location services;

requesting the location of the cellular communication device from the first location server;

determining that there has been a failure to receive the location of the cellular communication device from the first location server;

in response to determining that there has been a failure to receive the location of the cellular communication device from the first location server and instead of reporting an error to a gateway mobile location server: (a) identifying a second location server as an alternative to the first location server, and (b) requesting the location of the cellular communication device from the second location server; and in response to the determining, changing the status information to indicate that the first location server is currently disqualified as a provider of location services.

17. The mobility management component of claim 16, wherein:

the mobility management component comprises a Mobile Management Entity (MME) of a Global System for Mobile (GSM) network;

the request is received from a Gateway Mobile Location Center (GMLC) of the GSM network, wherein the gateway mobile location server comprises the GMLC; and each of the first and second location servers comprises a Serving Mobile Location Center (SMLC) of the GSM network.

18. The mobility management component of claim 16, the actions further comprising:

determining that there has been a failure to receive the location of the cellular communication device from the second location server;

based at least in part on the status information, identifying a third location server that is not currently disqualified as a provider of location services;

requesting, from the third location server, the location of the cellular communication device; and returning the location of the cellular communication device as a response to the request.

19. The mobility management component of claim 16, the actions further comprising:

requesting, from another location server, another location of another cellular communication device;

determining that there has been another failure to receive the other location of the other cellular communication device from the other location server;

determining that the other failure is due to one or more pre-designated causes; and in response to determining that the other failure is due to the one or more pre-designated causes, changing the status information to indicate that the other location server is currently disqualified as a provider of location services.

20. The mobility management component of claim 16, the actions further comprising:

receiving another request for another location of another cellular communication device;

requesting, from another location server, the other location of the other cellular communication device;

determining that there has been another failure to receive the other location of the other cellular communication device from the other location server;

determining that the other failure is not due to any of one or more pre-designated causes; and in response to determining that the other failure is not due to any of the one or more pre-designated causes, returning an indication of the other failure.

* * * * *